(12) United States Patent
Härkönen et al.

(10) Patent No.: US 9,540,217 B2
(45) Date of Patent: Jan. 10, 2017

(54) APPARATUS CONFIGURED WITH A SENSOR

(71) Applicant: Konecranes Plc, Hyvinkää (FI)

(72) Inventors: Tuomo Härkönen, Jokela (FI); Tuomas Martinkallio, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 84 days.

(21) Appl. No.: 14/418,843

(22) PCT Filed: Jul. 23, 2013

(86) PCT No.: PCT/FI2013/050771
§ 371 (c)(1),
(2) Date: Jan. 30, 2015

(87) PCT Pub. No.: WO2014/020235
PCT Pub. Date: Feb. 6, 2014

(65) Prior Publication Data
US 2015/0225209 A1    Aug. 13, 2015

(30) Foreign Application Priority Data
Aug. 3, 2012 (FI) ..................... 20125829

(51) Int. Cl.
| G08B 21/00 | (2006.01) |
| B66C 13/16 | (2006.01) |
| G01D 3/08 | (2006.01) |
| B66D 1/28 | (2006.01) |
| H04Q 9/00 | (2006.01) |

(52) U.S. Cl.
CPC ............... B66C 13/16 (2013.01); B66D 1/28 (2013.01); G01D 3/08 (2013.01); H04Q 9/00 (2013.01)

(58) Field of Classification Search
CPC ............ B66C 13/16; G01D 3/08; B66D 1/28; H04Q 9/00
USPC .................. 340/870.16, 521, 540, 669, 671, 672,340/679, 683, 685
See application file for complete search history.

(56) References Cited

U.S. PATENT DOCUMENTS

| 5,208,162 A | 5/1993 | Osborne et al. |
| 5,903,856 A | 5/1999 | Rompe |
| 6,140,930 A * | 10/2000 | Shaw .............. B66C 13/44 212/276 |
| 6,523,423 B1 * | 2/2003 | Namerikawa ........ G01L 5/167 73/862.391 |
| 8,823,509 B2 * | 9/2014 | Hyland ................ H04Q 9/00 340/539.1 |
| 2004/0183002 A1 | 9/2004 | Rodi |
| 2005/0143956 A1 | 6/2005 | Long et al. |
| 2006/0148410 A1 | 7/2006 | Nelson et al. |
| 2007/0008119 A1 | 1/2007 | Pohle et al. |

(Continued)

FOREIGN PATENT DOCUMENTS

| CN | 101107640 A | 1/2008 |
| CN | 101127252 A | 2/2008 |

(Continued)

*Primary Examiner* — Kevin Kim
(74) *Attorney, Agent, or Firm* — Birch, Stewart, Kolasch & Birch, LLP

(57) ABSTRACT

An apparatus is configured with a set of operating instructions and a sensor for monitoring an environment of the apparatus. The environment of the apparatus is monitored for compliance with the set of operating instructions.

20 Claims, 2 Drawing Sheets

(56) References Cited

U.S. PATENT DOCUMENTS

| | | |
|---|---|---|
| 2008/0069290 A1 | 3/2008 | Park et al. |
| 2008/0094209 A1 | 4/2008 | Braun |
| 2009/0066505 A1 | 3/2009 | Jensen et al. |
| 2009/0071270 A1 | 3/2009 | Petersen et al. |
| 2010/0044332 A1 | 2/2010 | Cameron |
| 2011/0131003 A1 | 6/2011 | Tusvik |
| 2011/0248846 A1* | 10/2011 | Belov .................. H04Q 9/00 340/539.1 |

FOREIGN PATENT DOCUMENTS

| | | |
|---|---|---|
| CN | 101666737 A | 3/2010 |
| CN | 102583160 A | 7/2012 |
| EP | 2246287 A1 | 11/2010 |
| WO | WO 03/023439 A2 | 3/2003 |

* cited by examiner

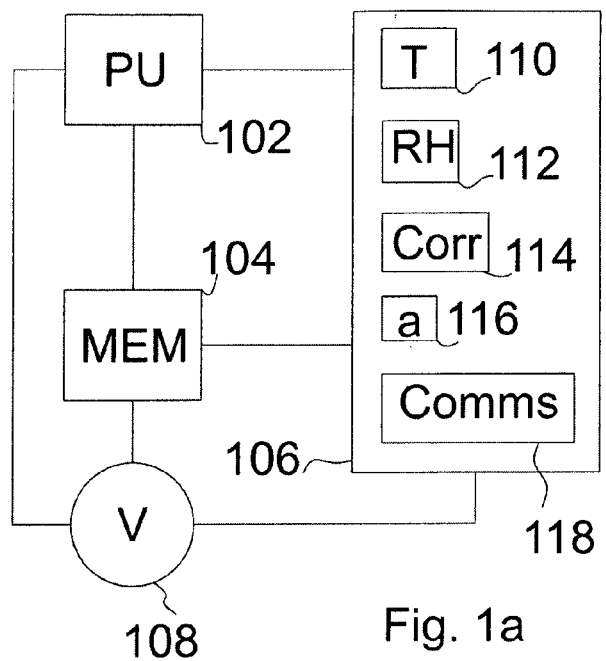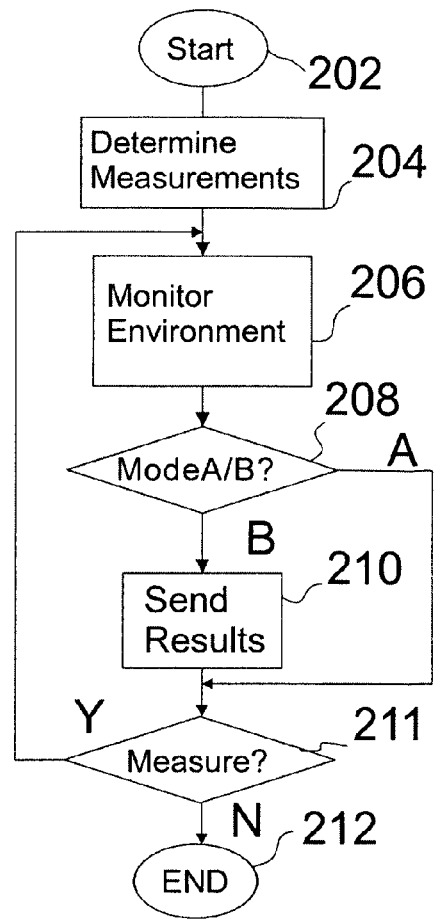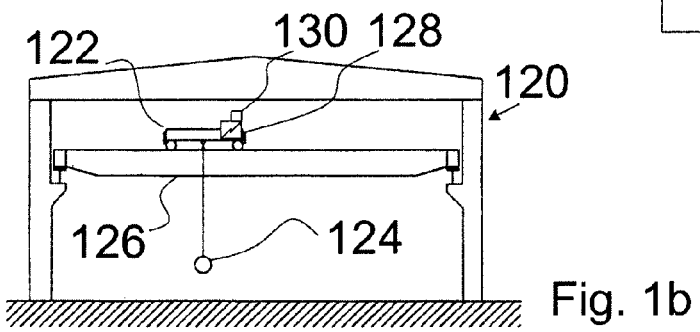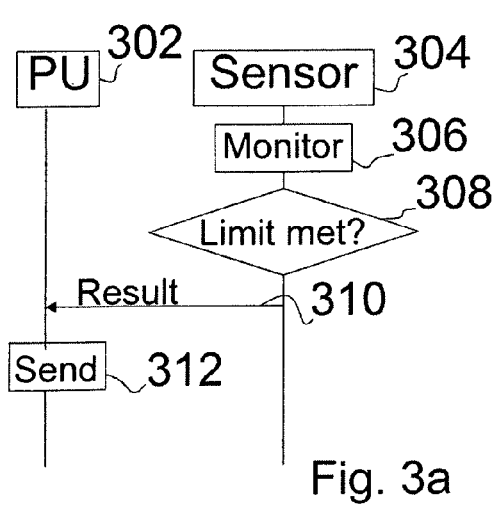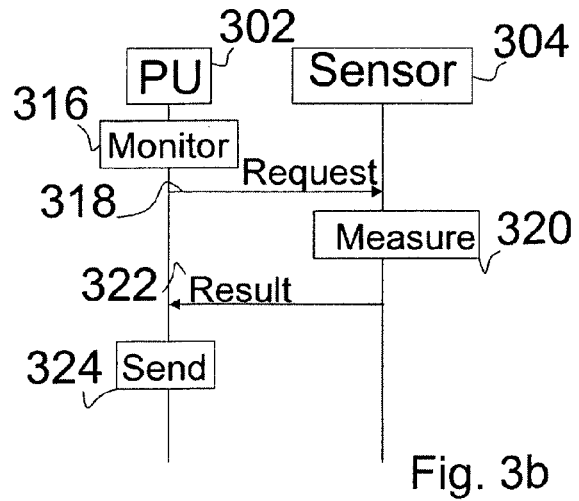

APPARATUS CONFIGURED WITH A SENSOR

FIELD

The present invention relates to monitoring an environment of an apparatus, and more specifically an apparatus equipped with a sensor for monitoring the environment.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A good condition of hoisting devices, such as bridge cranes and gantry cranes, is desirable in terms of both economic and security aspects. A fault of a hoisting device e.g. a fault in its brake, may lead to dropping of the load, which may cause damage to the hoisting device and/or danger to personnel working near the hoisting device. During maintenance, the hoisting device is not in productive use. From an economic point of view, the downtime of expensive machinery like the hoisting device should be kept as short and few as possible.

Maintenance of hoisting devices requires highly trained personnel, who may be servicing hoisting devices on a wide geographical area. Since there is only a limited number of capable maintenance personnel, there may be some delay involved between a detection of a maintenance need of a hoisting device, e.g. in case of a fault, and arrival of the maintenance personnel to servicing the hoisting device.

A maintenance plan of a hoisting device includes pre-scheduled maintenances specifying operations to be performed during maintenance. The maintenance plan tries to minimize faults of the hoisting device between the scheduled maintenances and thereby minimizing the downtime.

However, there may still be faults that occur between the scheduled maintenances, therefore requiring more visits by the maintenance personnel and decreasing the uptime of the hoisting device. These faults may be by nature such that they are difficult to detect by the maintenance personnel during the scheduled maintenances. The difficulty may follow from detection of the possible faults requiring a disproportional amount of time to be found, if there is any to be found. Accordingly, the extra time spent during maintenance for detecting faults may have a poor efficiency compared to the cost of the downtime of the hoisting device. The difficulty of detection of the faults may also follow from the faults being impossible to be detected by human eye or by conventional maintenance equipment carried by the maintenance personnel visiting the hoisting device.

BRIEF DESCRIPTION OF THE EMBODIMENTS

According to an aspect of the invention there is provided a method comprising configuring an apparatus with a set of operating instructions and a sensor for monitoring an environment of the apparatus, and monitoring the environment of the apparatus for compliance with the set of operating instructions.

According to another aspect of the invention there is provided an apparatus configured with a set of operating instructions and comprising means configured to perform a method according to an aspect.

According to another aspect of the invention there is provided an apparatus comprising at least one processor, and at least one memory including computer program code, the at least one memory and the computer program code configured to, with the at least one processor, cause the apparatus at least to perform the steps of a method according to an aspect.

According to another aspect of the invention there is provided an apparatus comprising sensors configured to provide data representing an effect of an operating environment of the apparatus on maintenance of the apparatus, the sensors including at least one of: a corrosion sensor configured to provide data representing a corrosive effect of the environment on electrical devices of the apparatus, and an acceleration sensor configured to provide data of external shocks to and collisions of the apparatus, acceleration being preferably measured in three dimensions measured in x, y and z directions of a Cartesian coordinate axes.

According to another aspect of the invention there is provided a computer program product comprising executable code that when executed, cause execution of functions of a method according to an aspect.

According to another aspect of the invention there is provided a system comprising one or more apparatuses according to an aspect.

Although the various aspects, embodiments and features of the invention are recited independently, it should be appreciated that all combinations of the various aspects, embodiments and features of the invention are possible and within the scope of the present invention as claimed.

Some embodiments may provide information on one or more characteristics of an environment of an apparatus. This information facilitates determining maintenance programs for apparatuses considering their environments of use and/or whether the instructions of use have been followed.

Further advantages will become apparent from the accompanying description.

BRIEF DESCRIPTION OF THE DRAWINGS

In the following the invention will be described in greater detail by means of preferred embodiments with reference to the accompanying drawings, in which FIG. 1a illustrates an apparatus equipped with a sensor for monitoring an environment of the apparatus according to an embodiment;

FIG. 1b illustrates a bridge crane equipped with a sensor for monitoring an environment of the apparatus according to an embodiment;

FIG. 2 illustrates a process for monitoring an environment of the apparatus according to an embodiment, FIG. 3a illustrates a process of a limit-based measurement of a characteristic of an environment;

FIG. 3b illustrates a process of a request-based measurement of a characteristic of an environment.

DETAILED DESCRIPTION OF THE EMBODIMENTS

Figure 4:
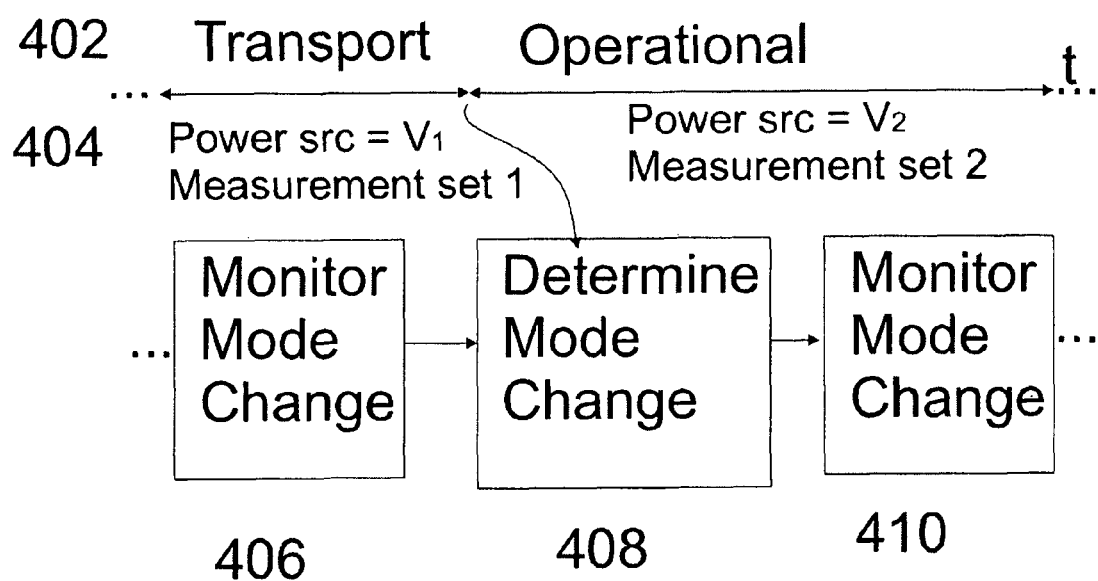
FIG. 4 illustrates a process of monitoring an environment of a bridge crane in at least two monitoring modes according to an embodiment.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

FIG. 1a illustrates an apparatus equipped with a sensor 110, 112, 114, 116 for monitoring an environment of the apparatus according to an embodiment. The apparatus comprises a processing unit (PU) 102, a memory (MEM) 104 and an interfacing unit 106 through which information may enter and leave the apparatus. All the units are electrically interconnected. A power source (V) 108 provides energy into the units. In one example the power source comprises a direct current (DC) voltage source.

In an embodiment, the apparatus has at least two modes for monitoring the environment. One of the monitoring modes may have smaller power consumption than another monitoring mode. The monitoring mode with smaller power consumption may be used when the power source of the apparatus has a limited capacity, e.g. one or more batteries. This may be the case when the apparatus is stored or transported without the batteries being re-charged. The monitoring mode with a higher power consumption may be used, when the power source, e.g. a battery, can be re-charged, or when an external power source is used to supply the power. Examples of the external power sources include an electrical system powered by a diesel-generator or a connection to electric mains. In the following description the smaller power consumption mode will be referred to a transportation mode and the higher consumption mode will be referred to as a deployed mode.

The power source 108 may be an internal power source or an external power source. The internal power source may be enclosed within a housing of the apparatus that encloses the units described in FIG. 1a. Thereby, although the power source may be removed from the sensor, the removal requires at least partly disassembling the housing of the apparatus. The external power source may be connected to the apparatus without a need to disassemble the apparatus and exposure of the units within the housing. In one example, the apparatus may be provided with a connector for connecting the external power source, whereby the connector may be covered with a cap. Then, the external power source may be connected to the connector simply by removing the cap, thus without exposure of the units within the housings.

Examples of internal power sources comprise various types of batteries including but not limited to D cells, C cells, AA cells, AAA cells and button cells. Examples of the external power sources include but are not limited to electrical mains and electrical systems powered by generators as are conventional in load handling equipment, a hoisting device, a crane, a bridge crane, a gantry crane, a tower crane, and a harbour cranes.

It should be appreciated that the power source 108 may also comprise energy harvesting means that receive energy wirelessly. Then, the apparatus may be powered wirelessly during transportation, storage and/or during its operation, when the apparatus is deployed. Wireless energy transfer provides a change of the power source by merely moving the apparatus from a range of one energy transmitter to a range of another one. In this way the power source may be changed with the location of the apparatus.

The interfacing unit 106 may comprise input units providing reception of information to the apparatus and output units providing transmission of information from the apparatus. The input units may comprise various kinds of sensors arranged to transduce signals into electrical signals to be input to the apparatus. Further, the input units may comprise a receiver of a communications signal. The output units may comprise a transmitter of a communications signal.

The communications signal may comprise data, frames, packets and/or messages according to one or more protocols of different communications technologies that may be wired or wireless. Examples of the wireless technologies include TETRA (Terrestrial Trunked Radio), LTE (Long Term Evolution), GSM (Global System for Mobile Communications), GPRS (General Packet Radio Service), WCDMA (Wideband Code Division Multiple Access), Direct Sequence-CDMA (DS-CDMA), OFDM (Orthogonal Frequency Division Multiplexing), WLAN (Wireless Local Area Network), WiMAX (Worldwide Interoperability for Microwave Access) or Bluetooth® standard, or any other suitable standard/non-standard wireless communication means. Examples of the wired technologies include Ethernet and universal Serial Bus (USB).

The interfacing unit 106 may comprise one or more units 110, 112, 114, 116 capable of receiving information of an environment of the apparatus. The environment may typically comprise an environment complying with instructions of use of the apparatus. The compliance of the environment to the instructions of use may be determined on the basis of one or more characteristics of the environment including one or more from a group comprising a temperature, humidity, a corrosion and acceleration. Each characteristic may be obtained by a sensor transducing a signal from the environment into an electrical signal representing the characteristic. One or more sensors may be combined into a single sensor.

In the apparatus illustrated in FIG. 1a, the interfacing unit comprises a temperature sensor (T) 110, a humidity sensor (RH) 112, a corrosion sensor (Corr) 114 and an accelerometer (a) 116 that operate as input units. A communications unit (Comms) 118 operates as input and output unit thereby providing reception and transmission of a communications signal. The communications signal may be a wired or a wireless communications signal, or both wireless and wired communications may be provided.

The on sensors of the apparatus are configured to provide data representing an effect of an operating environment of the apparatus. This data may comprise measured values by the sensors, notifications of limits met and/or data on maintenance of the apparatus.

The corrosion sensor 114 is arranged to measure corrosion for determining a corrosive effect of the environment on electrical devices of the apparatus. The corrosive effect may result in corroding the materials of the devices.

The accelerometer 116 is arranged to measure acceleration of the apparatus. Preferably the acceleration is measured in three dimensions e.g. x, y, and z axes of a Cartesian coordinate system. The acceleration is measured for irregular use of the apparatus. The irregular use comprises use of the apparatus not complying with instructions of use of the apparatus such as external shocks to the apparatus.

In an embodiment, an accelerometer 116 may be arranged to measure acceleration caused by irregular use by positioning the accelerometer to a location at the apparatus, where shocks should not occur when the apparatus is used regularly and according to its instructions of use. Such a location may comprise a hoisting equipment, for example. In addition or instead to arranging the location of the accelerometer suitable for detecting acceleration due to irregular use, a measurement of the acceleration may be limited to a desired range. Accordingly, the measurement may comprise only a notification or alert that a limit for acceleration has been met, e.g. that acceleration exceeds 10 g. Once the limit is exceeded, the actual value of acceleration above the limits may be measured. In this way, information of the acceleration due to irregular use of the apparatus may be obtained.

An example of a suitable accelerometer to be used in an embodiment comprises commercially available accelerometers such as those from STMicroelectronics. Suitable accelerometers may provide information of acceleration in three dimensions measured in x, y and z directions of a Cartesian coordinate axes. The measured scale spans from +/−2 g up to +/−24 g. Also other coordinate systems and numbers of dimensions may be used depending on implementation.

The communications unit 118 is arranged to provide reception and transmission of a communications signal. The communications unit may be provided by an input and output unit configured or arranged to send and receive data, frames, packets and/or messages according to one or more protocols as explained above. An example of a suitable cellular network modem for the interfacing unit comprise commercially available modems, such as those available from Huawei, providing transmission and reception of packet data and/or Short message Service (SMS) messages to the apparatus.

The temperature sensor 110 is arranged to provide a result of a measurement of a temperature. The result may be provided in degrees Centigrade, Fahrenheit or Kelvin or in any other suitable unit.

The humidity sensor 112 is arranged to provide a result of a measurement of humidity. The humidity may be measured as an absolute humidity, a specific humidity or a relative humidity. Relative humidity describes the amount of water vapor in a mixture of air and water vapor. Relative humidity may be defined as the ratio of the partial pressure of water vapor in the air-water mixture to the saturated vapor pressure of water in a specific pressure and temperature. Accordingly, the relative humidity of air depends not only on temperature but also on pressure of the system of interest.

In an embodiment, a temperature sensor and a humidity sensor are provided in a single device. In this way, the measured temperature is readily available for measuring the relative humidity.

In an embodiment an apparatus equipped with a sensor for monitoring an environment of the apparatus is configured with a set of operating instructions. The set of operating instructions may include instructions of use and/or instructions of the conditions of the operating environment of the apparatus. The instructions of use may define a normal use of the apparatus as well as its irregular use by explicit examples or implicitly by requiring conformance to law or regulations.

In an embodiment, the apparatus comprises a cargo moving apparatus, including but not limited to: a load handling equipment, a hoisting device, a crane, a bridge crane, a gantry crane, a tower crane, and a harbour crane. The Instructions of use of a cargo moving apparatus may define that a cargo should not be released when the apparatus is moving and/or the cargo is moved by the apparatus. Thereby, releasing the cargo during movement may be explicitly prohibited by the instructions of use since being considered irregular use of the apparatus. If not explicitly prohibited, such usage of the apparatus may be implicitly prohibited as not conforming to safety requirements defined by regulations and laws. Accordingly, the irregular use may comprise use of the apparatus compromising safety of the employees operating the cargo moving apparatus.

The instructions of use may define instructions regarding different operating environments of the apparatus. The different environments may include storage, transportation and/or operating environment of the apparatus, which all may have different instructions. The instructions of use may comprise instructions regarding one or more parameters that characterize an operating environment of the apparatus. The parameters include but are not limited to temperature and/or humidity of the environment of the apparatus. The temperature may comprise an operating temperature. The humidity may comprise a relative humidity. Each of the parameters may be defined by a range. The parameters may be measured within the range and/or outside the range. When measuring a parameter within the range, information may be obtained of the operating environment meeting the instructions of use of the apparatus. On the other hand, when a parameter is measured outside the range, information may be obtained of the apparatus not meeting the instructions of use and/or the apparatus operating in an exceptional environment, i.e. in an environment defining an irregular use of the apparatus.

FIG. 1b illustrates an apparatus equipped with a sensor for monitoring an environment of the apparatus according to an embodiment. In FIG. 1b, the apparatus is a bridge crane deployed in a warehouse 120 for moving a cargo 124. The bridge crane comprises a bridge 126 on which a trolley 122 is moving between walls of the warehouse. The trolley may be moved also in a depth direction in the warehouse with the bridge moving in the direction parallel to the walls, as is conventional to bridge cranes. The bridge crane comprises an electrical unit 128 arranged in the trolley. The electrical unit may comprise units responsible for power supply, power distribution and/or control units in the bridge crane. Examples of these units include inverters and/or control units, for example. A sensor 130 for monitoring environment of the apparatus is arranged to the trolley. The sensor may comprise an apparatus illustrated in FIG. 1a for example or the sensor may be provided as an interfacing unit 106 of FIG. 1a connecting to the bridge crane that controls the sensor for measuring the environment.

The sensor may be arranged to the location of the electrical unit or to a close proximity of the electrical unit to measure one or more characteristics of the environment at the electrical unit. The electrical unit may comprise components that are sensitive regarding exposure to irregular use of the apparatus. Although other parts of the bridge crane may also comprise sensitive components, the electrical unit may have the highest concentration of the sensitive components. Also or instead to having the highest concentration of sensitive components, the electrical unit may also host the one or more sensitive components that are most vulnerable. The vulnerability of a component may be determined by a range of a characteristic of the environment of the bridge crane. Accordingly, the vulnerability of a component is the higher the smaller a range is defined in the instructions of use for a given characteristic of the environment, e.g. temperature, humidity, corrosion, acceleration. For example a component with an operating temperature range between 0 to 10 degrees Centigrade is more vulnerable than a component with an operating temperature range of −20 to 50 degrees Centigrade.

Thereby, the life time and maintenance need of the electrical unit is greatly affected by the environment of the bridge crane. Accordingly, measurement of one or more characteristics of the environment by the sensor located at the electrical unit provides for determining the expected lifetime and maintenance need in the environment of the bridge crane.

FIG. 2 illustrates a process for monitoring an environment of the apparatus according to an embodiment. The process may be performed by the apparatus of FIG. 1a and/or a sensor arranged to a bridge crane illustrated in FIG. 1b. The process starts in 202 when the apparatus/bridge crane is configured with a set of instructions of use and equipped with a sensor for monitoring an environment of the apparatus/bridge crane. In the following description the embodiments will be described by referring to the bridge crane equipped with the sensor. However it should be appreciated that also other apparatuses may be equipped with a sensor according to an embodiment. Such apparatuses may include various kinds of apparatuses which have instructions of use, e.g. cars, house hold appliances.

The described embodiments provide advantages especially to apparatuses that may be exposed to a number of different environments after manufacturing of the bridge crane, e.g. during storage, transportation and after deployment of the bridge crane, when it is used for its designed purpose. Having a sensor for monitoring the various environments experienced by the apparatuses facilitates determining whether the apparatuses have been used according to the instructions of use and/or determining maintenance programs to meet the maintenance needs incurred by the different environments. For example an environment of the bridge crane having a high relative humidity may inflict corrosion, thereby reducing life time and/or the necessitating frequent maintenance of the bridge crane. In another example, an environment of the bridge crane having a high temperature may exceed the temperature range defined by the instructions of use, thereby invalidating warranty of the bridge crane. Also temperatures not exceeding the temperature range may cause a decrease of life time of the bridge crane or increase maintenance visits to the bridge crane. Accordingly, also the temperatures or other characteristics within the range defined by the instructions of use may provide information that helps in keeping the bridge crane operational and at the minimizing maintenance costs due facilitating the forecasting of the maintenance need.

The configuring 202 may comprise manufacturing the bridge crane to meet the instructions of use. The bridge crane may be manufactured from one or more components that have their own instructions of use, whereby the instructions of use for the bridge crane may be determined by a combination of the instructions of different parts of the bridge crane. For example, a temperature range of the instructions of use may be defined on the basis of the temperature ranges of the different parts of the bridge crane. In one example of defining the instructions use on the basis of the components, one component is configured with instructions of use having a temperature range of −20 to +50 degrees Centigrade and another component is configured with instructions of use having a temperature range of −100-100 degrees Centigrade. Then the instructions of use of the bridge crane may be defined according to meet the instructions of the sensitive component to −20 to +50 degrees Centigrade.

In 204 one or more characteristics for monitoring the environment are determined. A characteristic may be monitored by determining a measurement of the characteristic and including information defining when the measurement is performed. The information defining when the measurement is performed may include a time interval of successive measurements, a limit for the measured characteristic and/or a number of times the measurement is performed. The monitored characteristics may include one or more characteristics of a temperature, humidity, acceleration and corrosion. The humidity may be defined as a relative humidity. In an embodiment, the monitored characteristics may be as those provided by the sensors that the bridge crane have been equipped with.

A characteristic may be measured to determine whether a limit associated with the characteristic has been met. Table 1 illustrates examples of limits for a corrosion sensor and a combined temperature humidity and temperature sensor. When a measured characteristic, in the example of Table 1 the temperature, humidity or corrosion, meets its defined limit, information of meeting the limit may be communicated as an alarm. This alarm may comprise a measurement of the characteristic meeting the limit.

TABLE 1

Measurement limits

| Description | Unit | Value |
|---|---|---|
| Limit for alarming high temperature | C. | 30 |
| Limit for alarming low temperature | C. | −20 |
| Limit for alarming high humidity | rh | 80 |
| Limit for alarming high acceleration | g*10 | 10 |
| Limit for alarming high corrosion | Hz | 1000 |

When more than one characteristic are measured, the measurement for each characteristic may be determined 204 with the same a measurement interval or different measurement intervals may be used for different characteristics. In one example a temperature measurement and a humidity measurement may have a shorter measurement interval than a corrosion measurement. The longer measurement interval than the measurement interval for temperature and humidity may be sufficient for corrosion since, whereas both temperature and humidity decrease and increase by the time of day, corrosion only accumulates. Thereby, the time interval for measuring the corrosion provides visibility to the speed at which corrosion progresses. However, the time interval for measuring the temperature and humidity provides visibility not only to the speed but also the direction of the change may vary. Accordingly, having a longer measurement interval for the corrosion provides a lower power consumption of the measurements than if the same measurement interval with the temperature and humidity was used. Table 2 illustrates examples of measurement intervals for a corrosion sensor and a combined temperature humidity and temperature sensor.

TABLE 2

Measurement intervals.

| Description | Unit | Value |
|---|---|---|
| Measurement interval of temperature and humidity | min | 240 |
| Measurement interval of corrosion | min | 1440 |

In the example of Table 2, the measurement intervals of the temperature and the relative humidity are set the same and to 4h. In this way a result of the temperature measurement may be made available for the relative humidity measurement. When the temperature and humidity sensors are located within the same device, making the humidity and temperature measurements at the same time enables the combined temperature and humidity sensor to be continuously in a low power consumption state longer than if different measurement intervals were used for the temperature and humidity. With the 4 h interval, weather at the operating environment of the bridge crane may be monitored at all times of day, i.e. in the night, in the daytime, in the morning and in the evening.

In an embodiment, a measurement interval of the temperature and the relative humidity may be set the same and to 12 h. In this way approximate information may be obtained of the highest and lowest temperature of the day, e.g. by setting the first measurement at noon and the second at midnight.

A measurement of corrosion may be implemented by a corrosion sensor comprising a crystal balance. Such a sensor includes a crystal of piezoelectric material, e.g. quartz. A changing electric current fed into the crystal causes the crystal to resonate on its characteristic frequency. This characteristic frequency may depend on implementation, e.g. thickness of the crystal. A suitable characteristic frequency for the crystal may be 10 MHz or 6 MHz. of which 10 MHz is preferred since providing improved accuracy. The corrosion measurement is based on a phenomenon that a weight placed on the crystal decreases the characteristic frequency of the crystal. Accordingly, the corrosion sensor may be implemented by measuring a change of a characteristic frequency of a crystal, when a piece of corroding material is placed on it. The corrosion of the material changes the weight on the crystal and therewith also the characteristic frequency. A sensor employing a quartz crystal in the above-described way is conventionally referred to as a Quartz Crystal Microbalance (QCM).

In an embodiment, a limit for corrosion may be determined as 1 KHz decrease per day in a characteristic frequency of 10 MHz of a crystal balance. Accordingly, the decrease of the frequency by 0.001% or more can be considered as corresponding to significant corrosion.

In an embodiment, a measurement interval of corrosion measurement may be set to 24 h. In this way status information of the bridge crane regarding the corrosion may be provided for each day. Combining the 24 h corrosion measurement interval with at least two temperature and humidity values measured per day, information of the effect of the weather to the bridge crane may be determined. With more than two values of temperature and humidity per day, a more detailed statistics may be obtained of the weather conditions prevailing at the operating environment of the bridge crane.

In an embodiment a measurement determined 204 for a characteristic in transportation mode has a shorter measurement interval than a measurement determined for the characteristic in a deployed mode. In this way the power consumption may be kept smaller during the transportation or storage of the bridge crane. Also and/or instead of having a longer time between measurements in the transportation mode, energy requirement in the transportation mode may be decreased compared to the deployed mode by determining the modes with different characteristics to measure. Accordingly, in the transportation mode, a set including one or more characteristics may be determined such that their energy consumption is less than the energy consumption of a set of characteristics in the deployed mode. In one example, a sensor may include a plurality of sensors, each corresponding to one or more characteristics e.g. separate a temperature sensor, a humidity sensor, a corrosion sensor and an accelerometer. Then, in the transportation mode only a part of the sensors may be used for monitoring. In one example in the transportation mode monitoring is performed only using the acceleration sensor, whereas in the deployed mode all the sensors may be used for monitoring. In this way, measuring unnecessary characteristics may be avoided, since when the bridge crane is not deployed, its requirements for operating environment may be not as strict as once deployed. Limiting the measurements only to acceleration may be used to determine impacts e.g. due to collisions that may cause physical damage to the bridge crane. However, since during transportation and/or storage the effect of the other characteristics to a maintenance need of the bridge crane are more limited than once deployed, power may be saved by omitting their monitoring.

It should be appreciated that a transportation mode monitoring may comprise also time of the bridge crane spent in a storage waiting to be transported and/or a plurality of transportations that may use any form of transportation means, including but not limited to road, air and marine transportation of the bridge crane.

It should be appreciated that a deployed mode monitoring may start when a bridge crane has arrived at a location where it is to be deployed or at least when the deployment of the bridge crane has been finished and it is operational. The deployment of the bridge crane may be finished when the bridge crane has arrived at the location and is operational.

In an embodiment measurements are determined 204 for at least two monitoring modes. Each of the modes may then have its own measurements. This embodiment will explained in the following with reference to FIG. 4, illustrating a process of monitoring an environment of a bridge crane by measuring a plurality 404 of characteristics of the environment in at least two monitoring modes, a transportation mode and a deployed mode 402. The two monitoring modes comprise different measurements (Measurement set 1, Measurement set 2) of the plurality of measured characteristics. The measurements may differ in terms of measured characteristics and/or information defining when the measurement is performed, e.g. in terms of measurement interval used of a specific characteristic. Measurements of the environment prior to deployment may facilitate understanding maintenance requirement of the bridge crane later on, e.g. once deployed. The measurements after the deployment, in the deployed mode, provide following compliance with the instructions of use of the bridge crane and determining a maintenance program of the bridge crane on the basis of the information collected during the transportation mode monitoring.

In 406, 410 a change of a monitoring mode change is monitored. The monitoring may comprise detecting any changes in a type of power source used. The type may be determined on the basis of an amount of energy received and/or from the change of electrical energy received. In one example a change of received electrical energy from Alternating Current (AC) to Direct Current (DC) indicates a change of the power source. In another example the amount of energy received may be measured in voltages and a voltage level received is used to determine the type of the power source. Accordingly, a monitoring mode may be determined on the basis of a received voltage level being within a range of voltages defined for the mode.

In 408 a change of the monitoring mode is determined. The determining may be made on the basis of the monitoring performed in 406. The change may be determined on the basis of a change of a received voltage level, for example. When a received voltage level is below a threshold voltage $V_{th\_low}$, a transportation monitoring mode may be determined. When a received voltage level is above a threshold voltage $V_{th\_high}$, a deployed monitoring mode may be determined. The threshold voltages may be the same, however, preferably they are different such that $V_{th\_high} > V_{th\_low}$, to avoid any errors in determining the monitoring mode.

After determining the change of mode in 408, the monitoring may be continued in 410 to determine changes in the type of power source used.

In one example, during transportation, a received voltage level may be 5V and when the apparatus is deployed, a 24 V voltage may be received. Thereby, a change of monitoring mode form a transportation mode and a deployed mode monitoring may be determined, when a received voltage level changes from 5 V to 24 V. In this example, the $V_{th\_low}$ may be determined as 6 V and the $V_{th\_high}$ as 22 V for example. Also other voltage values may be chosen satisfying $V_{th\_high} > V_{th\_low}$.

In an embodiment, a change of monitoring mode may be determined 408 by the change of a direct current (DC) to alternating current (AC). During transportation a DC power source may supply the voltage to the monitoring and after the deployment of the apparatus voltage may be supplied by an AC power source. Accordingly, the monitoring mode may be changed on the basis of the change of the received electrical energy changing from DC to AC, or vice versa. The received DC voltages may be 5, 12, or 24 V, for example. The received AC voltages may be 42V, 48V, 115V or 230V AC, for example.

Referring back to FIG. 2, in 206 the environment of the bridge crane is monitored for compliance with the set of operating instructions. During monitoring, one or more characteristics of the environment are measured and results of the measurements may be obtained. The monitoring may be performed according to the measurement determined in 204.

FIGS. 3a and 3b illustrate processes of monitoring an environment by a Processing Unit (PU) 302 connected to a sensor for measuring a characteristic of the environment. The processes may be performed by the bridge crane of FIG. 1a, for example and employed in the process of FIG. 2 and step 206.

In the process of FIG. 3a the measurement of a characteristic is performed by a sensor 304 as controlled by a Processing Unit (PU) 302. In the process of FIG. 3a, the characteristic is monitored 306 for meeting a limit configured to the sensor by the PU. When the characteristic meets 308 the configured limit, the characteristic is measured and information of meeting the limit is communicated 310 to the PU. The information of meeting the limit may be communicated to the PU by various ways including sending an alarm to the PU and/or sending a result of the measurement to the PU. The sending may comprise e.g. storing the result and/or alarm to a memory area accessible to the PU for reading.

It should be appreciated in the process of FIG. 3a, due to power conservation reasons it is possible that the actual value of the characteristic is not measured. In such a case, only an alarm is communicated to the PU.

In the process of FIG. 3b the measurement of a characteristic is performed by a sensor 304 as controlled by a Processing Unit (PU) 302. In the process of FIG. 3b, the PU to monitors 316 the characteristic by requesting 318 the sensor to measure the characteristic at predetermined measurement intervals and/or a predetermined number of times. It should be appreciated that also the sensor may perform scheduling of the measurements, when the request 318 to measure a characteristic to a sensor comprises information on a measurement interval and/or a number of times to measure the characteristic. Accordingly, a single measurement request may be used to arrange one or more measurement results 322 from the sensor. The sensor measures 320 the characteristic according to the request 318. A result of the measurement is communicated 322 to the PU. The communication may be performed in various ways as explained with the FIG. of 3a.

Depending 208 on the measurements determined in 204, the measurement results obtained in 206 may be communicated 210, 312, and 324 to a maintenance centre.

In an embodiment, when the environment is monitored at least two monitoring modes, when a transportation mode monitoring 'A' is employed 208, the results obtained in 206 are not sent and the process continues to 211. When a deployed mode monitoring 'B' is employed the results obtained in 206 are sent 210, 312, and 324 to a maintenance centre for determining a maintenance program for the bridge crane. In this way the maintenance program may be adapted to the actual environment of use and/or the environment that bridge crane has been exposed to during transportation or storage. The sending may comprise sending the results by a communications signal via the communications unit 118 illustrated in FIG. 1a, for example. In one example the results are sent by employing SMS messages. When a data connection to a communications network is available, Internet Protocol Packets may be employed for communications.

In 211, if more measurements are still to be made, the process continues from 211 to 206 to continue monitoring. If there are no more measurements to be performed and/or a power source of the sensor has been discharged, the process ends in 212.

In an embodiment, the decision in 211 to continue measurements may comprise determining whether a configuration of the sensor takes place. This may be determined e.g. by a USB cable being connected to the sensor. In an embodiment, monitoring is provided in a transportation mode by the process of FIG. 3a. It should be appreciated that a single PU may be connected to a single sensor or a plurality of sensors 118 as illustrated in FIG. 1a. Each sensor may be configured with one or more limits that are monitored in the transportation mode. Then when a limit is met, it is communicated to the PU. However, if no limits are met, there is no communication. Upon determining 208 a change of the transportation mode monitoring to a deployed mode monitoring the obtained results 310 206 may be communicated to the maintenance centre.

In an embodiment, monitoring is provided for a deployed bridge crane according to the process of FIG. 3b. It should be appreciated that a single PU may be connected to a single sensor or a plurality of sensors 118 as illustrated in FIG. 1a. The PU may be configured to measure the environment of the bridge crane. The PU requests 318 measurement from each sensor according to a measurement determined for the characteristic provided by the sensor. After receiving the request the sensor measures the characteristic and provides the result of the measurement to the PU. Upon determining 208 a change of the transportation mode monitoring to a deployed mode monitoring the obtained results 322 206 may be communicated to the maintenance centre.

In an embodiment an environment of a bridge crane is monitored according to the process of FIG. 3a during transportation of the bridge crane. Then the measurement of a characteristic of the environment is only performed, when the characteristic meets a limit. In this way, the number of measurements may be kept small provided that the limits are not met. Since in the transportation mode the available power may be limited, e.g. a battery, by arranging the measurements to occur only when the limits are met facilitates long monitoring times of the bridge crane. This may be useful, when the bridge crane is equipped with the sensor at manufacture and the bridge crane is only deployed after a long time period that may involve a number of transportations and storing the bridge crane for variable time periods.

An embodiment provides a single sensor monitoring of one or more limits configured to it according to the process of FIG. 3a and also measurement upon a request according to FIG. 3b. In a transportation mode, the sensor may operate according to the limit-based monitoring of FIG. 3a and in a deployed mode the sensor may operate according to the request-based monitoring of FIG. 3b. In this way power consumption may be kept small during the transportation since only the limits are monitored, and once the bridge crane is deployed, measurements of characteristics may be obtained when the limits are not met. Having measurements of the characteristics during the deployment of the bridge crane without meeting the limits provides collecting trend data of the environment of the bridge crane. When in the deployed mode, the sensor may operate according to both the processes of FIGS. 3a and 3b. In this way measurement results of the characteristics may be provided both when the limit is met and even if the limit would not be met by the request-based measurements.

The steps/points, and related functions described above in FIGS. 2, 3a, 3b, and 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

The present invention is applicable to a sensor for monitoring environment and corresponding component, and/or to any apparatus equipped with the sensor including, but not limited to, a load handling equipment, a hoisting device, a crane, a bridge crane, a gantry crane, a tower crane, and a harbour crane.

Apparatuses, such as sensors, or corresponding components and/or other corresponding devices or apparatuses implementing the functionality of a corresponding apparatus described with an embodiment comprise not only prior art means, but also means for configuring an apparatus with a set of operating instructions and a sensor for monitoring an environment of the apparatus, means for monitoring the environment of the apparatus for compliance with the set of operating instructions.

In addition, they may comprise means for measuring at least one characteristic of the environment and means for sending a result of the measurement to a maintenance centre.

More precisely, the various means comprise means for implementing functionality of a corresponding apparatus described with an embodiment and it may comprise separate means for each separate function, or means may be configured to perform two or more functions. Present apparatuses comprise processors and memory that can be utilized in an embodiment. For example, functionality of an apparatus according to an embodiment may be implemented as a software application, or a module, or a unit configured as arithmetic operation, or as a program (including an added or updated software routine), executed by an operation processor. Programs, also called program products, including software routines, applets and macros, can be stored in any apparatus-readable data storage medium and they include program instructions to perform particular tasks. All modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a sensor or corresponding components and/or other corresponding devices or apparatuses described with an embodiment may be configured as a computer or a microprocessor, such as single-chip computer element, including at least a memory for providing storage area used for arithmetic operation and an operation processor for executing the arithmetic operation. An example of the operation processor includes a central processing unit. The memory may be removable memory detachably connected to the apparatus.

For example, an apparatus according to an embodiment may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
configuring an apparatus with a set of operating instructions and at least one sensor for monitoring an environment of the apparatus;
monitoring, using the at least one sensor, the environment of the apparatus using at least two monitoring modes comprising a transportation mode of the apparatus and a deployed mode of the apparatus, wherein the transportation mode has a smaller power consumption than the deployed mode; and
determining, on the basis of characteristics of the environment obtained from the at least one sensor and using the at least two monitoring modes, compliance of the environment with the set of operating instructions of the apparatus.

2. A method according to claim 1, comprising:
measuring at least one characteristic of the environment and sending a result of the measurement to a maintenance centre.

3. A method according to claim 1, wherein the monitoring comprises measuring a plurality of characteristics of the environment in at least two monitoring modes, and the modes comprise different measurements of the plurality of the characteristics.

4. A method according to claim 1, wherein the monitoring comprises at least two modes, and a switch between the modes is determined on the basis of a power source used for the sensor.

5. A method according to claim 1, wherein the monitoring comprises at least two modes, and wireless energy transfer is used to power one or more of the modes.

6. A method according to claim 1, wherein the monitoring comprises at least two modes comprising a monitoring mode for transportation of the apparatus and a monitoring mode for a deployed apparatus, and the transportation mode comprises monitoring whether any limits of a measured characteristics are exceeded, and the deployed mode comprises monitoring whether any limits of a measured characteristic are exceeded and monitoring values of a measured characteristic within the limits.

7. A method according to claim 1, wherein the operating instructions comprise at least one or a combination of items of a group comprising: operating environment temperature, operating environment humidity and instructions of use.

8. A method according to claim 1, wherein the monitoring comprises measuring one or more characteristics of the environment comprising: temperature, humidity, corrosion and acceleration.

9. A method according to claim 1, wherein the monitoring comprises measuring acceleration of the apparatus in order to detect external shocks to and collisions of the apparatus, acceleration being preferably measured in three dimensions measured in x, y and z directions of a Cartesian coordinate axes.

10. A method according to claim 1, wherein the monitoring comprises measuring corrosion for determining a corrosive effect of the environment on electrical devices of the apparatus.

11. A method according to claim 1, wherein a corrosion is measured by a crystal balance, preferably Quartz Crystal Microbalance, and the monitoring comprises:
    measuring a change of a characteristic frequency of the crystal balance, wherein the measured change is less than 0.001% per day.

12. An apparatus comprising means configured to perform a method according to claim 1.

13. An apparatus according to claim 12, wherein the apparatus is one from a group comprising: a load handling equipment, a hoisting device, a crane, a bridge crane, a gantry crane, a tower crane, and a harbour crane.

14. An apparatus comprising sensors configured to provide data representing an effect of an operating environment of the apparatus on maintenance of the apparatus, the sensors including at least one of: a corrosion sensor configured to provide data representing a corrosive effect of the environment on electrical devices of the apparatus, and an acceleration sensor configured to provide data of external shocks to and collisions of the apparatus, acceleration being preferably measured in three dimensions measured in x, y and z directions of a Cartesian coordinate axes,
    wherein the apparatus is configured to cause monitoring the environment of the apparatus by the sensors and using at least two monitoring modes comprising a transportation mode of the apparatus and a deployed mode of the apparatus, wherein the transportation mode has a smaller power consumption than the deployed mode, and determining, on the basis of characteristics of the environment obtained from the sensors using at least one of the monitoring modes, compliance of the environment with the set of operating instructions of the apparatus.

15. An apparatus according to claim 14, wherein the apparatus is one from a group comprising: a load handling equipment, a hoisting device, a crane, a bridge crane, a gantry crane, a tower crane, and a harbour crane.

16. An apparatus comprising means configured to perform a method according to claim 2.

17. An apparatus comprising means configured to perform a method according to claim 3.

18. An apparatus comprising means configured to perform a method according to claim 4.

19. An apparatus comprising means configured to perform a method according to claim 5.

20. An apparatus comprising means configured to perform a method according to claim 6.

* * * * *